UNITED STATES PATENT OFFICE 2,550,923

LIQUIDS COMPRISING SILICYL ESTERS

John Edward Hackford, Clifford Shaw, and William Edwin Smith, London, England

No Drawing. Application December 26, 1945, Serial No. 637,289. In Great Britain May 9, 1944

8 Claims. (Cl. 106—287)

This invention relates to liquids comprising silicyl esters for use as coating compositions, e. g. for fireproofing and other purposes, or as binders in the production of moulded articles.

By the term silicyl esters as used in this specification and claims is meant alkoxy, aryloxy and aralkoxy silicanes. Such compounds, as is well known, when treated with water are hydrolysed, and according to the amount of water used one or more of the ester groups are converted into hydroxyl groups with the liberation of the respective alcohol or phenol. In the presence of sufficient water to hydrolyse the ester completely in the case of tetra alkoxy silicanes, silicic acid and ultimately hydrated silica are formed. This reaction is accelerated by the presence of mineral acids.

If the quantity of water used for hydrolysis is equivalent to 1½ mols of water or more to each mol of silicyl ester, gelling and film formation takes place with or without accelerators. Unfortunately such liquids are of very limited application because they are unstable, forming gels more or less rapidly (according to the hydroxyl content) during storage and thus becoming useless as coating compositions. If, on the other hand, water corresponding to less than 1½ mols per mol of silicyl ester is added, for example enough to replace only one of its alkoxy or aryloxy groups by a hydrolysed group, stability is maintained and the liquid may be stored without gelling for a long period of time because it does not decompose nor polymerise nor condense, but in this case it will not form films and is thus again useless as a coating composition.

The present invention is based on the discovery that the addition of a small proportion of piperidine to a silicyl ester to which not more than 1½ mols of water per mol of silicyl ester has been added, gives a stable liquid which is film-forming. Moreover, on adding further water to the liquid thus obtained gelling takes place in a time proportional to the amount of piperidine present. This discovery forms the basis of the present invention, an object of which is the production of a stable liquid which, by the mere addition of water, could be made to gel within a controlled space of time, enabling manipulations to be effected before gelation occurred.

While the invention is not dependent on any theory as to what takes place, it is believed that this surprising result is due to the formation of primary condensation and polymerisation products which remain in stable dispersion with liberated alcohol. The piperidine appears to promote this desired reaction as against the well-known action of mineral acids which promote hydrolysis to silicic acid and precipitation of hydrated silica. The reaction appears to be somewhat as follows where 1–1½ mols of water per mol of ester are present:

(1) $Si(OR)_4 + H_2O \rightarrow Si(OR)_3.OH + R.OH$
(2) $2.Si(OR)_3OH \rightarrow Si(OR)_3-O-Si(OR)_3 + H_2O$ However this may be, we have found that silicyl esters containing a small proportion (not more than about 5%) of piperidine give, when an amount of water is added corresponding to 1–1½ mols per mol of ester, film-forming, thermo-hardening compositions. The water may be added either before or after the addition of the piperidine, or may be present in the alcohol or phenol used for making the silicyl ester. Thus a pure silicyl ester may be produced and piperidine added. The user in this case would have to add the whole of the water required for partial hydrolysis. It is, however, cheaper to use a hydrated alcohol for the production of the silicyl ester, in which case the mixture of piperidine and ester will already contain some of the water necessary for the required hydrolysis and therefore the balance of the required water only will have to be added.

According to the present invention, therefore, in its broadest aspect a liquid composition capable of forming with water a film-forming coating comprises a silicyl ester as above defined and a proportion not more than about 5% by weight of piperidine.

It has been further found that morpholine acts in every way as equivalent to piperidine.

It was believed that other cyclic nitrogen compounds of a similar constitution to piperidine would act in a similar manner, but up to the time of filing only one such body has been found, namely morpholine. Morpholine must therefore be regarded as a chemical equivalent to piperidine in this specification and claims.

For many commercial purposes, however, it is important that the composition contains a constant proportion of water so that the water to be added by the user will always be the same for the same purpose.

Accordingly an important feature of the invention is a stable film-forming liquid composition comprising a silicyl ester having a hydroxyl content corresponding to that obtained by the addition of 1–1½ mols of water per mol of ester, together with not more than 5% by weight of piperidine or morpholine.

The invention further includes the method of accelerating the formation of films from, and the gelling of, partially hydrolysed silicyl esters which comprises adding piperidine or morpholine to a silicyl ester at any stage prior to gelation and before or after the necessary water for the required partial hydrolysis.

The amount of piperidine or morpholine will vary somewhat according to how fast the ultimate gelation of the product is desired after application of the coating to the article to be coated. It has been found that for most purposes an amount of 1–5% is suitable. Less than 1% the action is too feeble for most purposes, and above 5% the rate of gelation is so fast that insufficient time to carry out the requisite operations is allowed. An amount of 2% has been found especially suitable.

The composition according to the invention will find application in numerous ways, for example as a waterproof and fire-proofing coating composition and as a binder, for which purposes it may be stored almost indefinitely. When used as a binder it may be diluted with water to bring the hydroxyl content above that corresponding to the addition of 1½ mols water per mol of ester. Alternatively the filler may be damped or wetted with this added water, thus aiding the uniform dispersion of the liquid throughout the solid filler in making a mouldable composition.

What we claim is:

1. A liquid composition suitable for use as a binder when diluted with water consisting essentially of a silicyl ester selected from the group consisting of alkoxy, aryloxy and aralkoxy silicanes characterized only by carbon-oxygen-silicon linkages and from 1 to 5% by weight of the ester, of a substance selected from the group consisting of piperidine and morpholine, said substance being adapted to cause gel formation within a controlled length of time upon dilution with water in amount sufficient to bring the hydroxyl content above that corresponding to 1½ mols of water per mol of said silicyl ester.

2. A stable film-forming liquid composition consisting essentially of a partially hydrolysed silicyl ester selected from the group consisting of alkoxy, aryloxy and aralkoxy silicanes characterized only by carbon-oxygen-silicon linkages and having a hydroxyl content corresponding to that obtained by the addition of 1 to 1½ mols of water per mol of ester, together with from 1 to 5% by weight of the ester, of a substance selected from the group consisting of piperidine and morpholine, said substance being adapted to cause gel formation within a controlled length of time upon dilution with water in amount sufficient to bring the hydroxyl content above that corresponding to 1½ mols of water per mol of said silicyl ester.

3. A liquid composition consisting essentially of tetra ethoxy silicane and piperidine in from 1 to 5% of the weight of the tetra ethoxy silicane, said piperidine being adapted to cause gel formation within a controlled length of time upon dilution with water in amount sufficient to bring the hydroxyl content above that corresponding to 1½ mols of water per mol of silicyl ester.

4. A liquid composition consisting essentially of tetra ethoxy silicane and morpholine in from 1 to 5% of the weight of the tetra ethoxy silicane, said morpholine being adapted to cause gel formation within a controlled length of time upon dilution with water in amount sufficient to bring the hydroxyl content above that corresponding to 1½ mols of water per mol of silicyl ester.

5. A film-forming liquid composition consisting essentially of a partially hydrolysed tetra ethoxy silicane having a hydroxyl content corresponding to that obtained by the addition of 1 to 1½ mols of water per mol of ester together with from 1 to 5%, of piperidine, said piperidine being adapted to cause gel formation within a controlled length of time upon dilution with water in amount sufficient to bring the hydroxyl content above that corresponding to 1½ mols of water per mol of silicyl ester.

6. A liquid composition as claimed in claim 5, wherein the proportion of piperidine is 2% by weight of the ester.

7. A liquid composition suitable for use as a binder when diluted with water as claimed in claim 1, wherein the silicyl ester contains less than one molecular proportion of water per molecule of silicyl ester.

8. A method of preparing a liquid composition suitable for use as a binder for the refractory aggregate in the production of metal casting moulds, said method comprising adding piperidine in proportion varying from 1 to 5% by weight, to a compound consisting essentially of a silicyl ester selected from the group consisting of alkoxy, aryloxy and aralkoxy silicanes characterized only by carbon-oxygen-silicon linkages, the said silicyl ester containing less than one molecular proportion of water, said piperidine being adapted to cause gel formation within a controlled length of time upon dilution with water in amount sufficient to bring the hydroxyl content above that corresponding to 1½ mols of water per mol of silicyl ester and just prior to use adding sufficient water to bring the hydroxyl content above that corresponding to 1½ molecules of water per molecule of silicyl ester.

JOHN EDWARD HACKFORD.
CLIFFORD SHAW.
WILLIAM EDWIN SMITH.

REFERENCES CITED

The following references are of record in the file of this patent:

UNITED STATES PATENTS

| Number | Name | Date |
|---|---|---|
| 2,375,998 | McGregor | May 15, 1945 |
| 2,384,384 | McGregor | Sept. 4, 1945 |
| 2,389,805 | McGregor | Nov. 27, 1945 |
| 2,389,806 | McGregor | Nov. 27, 1945 |
| 2,398,187 | McGregor | Apr. 9, 1946 |